(12) United States Patent
Bramley et al.

(10) Patent No.: US 11,868,276 B2
(45) Date of Patent: Jan. 9, 2024

(54) NON-VOLATILE MEMORY WRITE ACCESS CONTROL

(71) Applicant: HEWLETT-PACKARD DEVELOPMENT COMPANY, L.P., Spring, TX (US)

(72) Inventors: Richard A Bramley, Mansfield, MA (US); Baraneedharan Anbazhagan, Spring, TX (US); Valiuddin Ali, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 42 days.

(21) Appl. No.: 17/830,730

(22) Filed: Jun. 2, 2022

(65) Prior Publication Data
US 2023/0393993 A1     Dec. 7, 2023

(51) Int. Cl.
*G06F 12/14* (2006.01)
*G06F 12/02* (2006.01)

(52) U.S. Cl.
CPC ...... *G06F 12/1416* (2013.01); *G06F 12/0246* (2013.01); *G06F 2212/1052* (2013.01); *G06F 2212/7207* (2013.01)

(58) Field of Classification Search
CPC ............. G06F 12/1416; G06F 12/0246; G06F 2212/1052; G06F 2212/7207
See application file for complete search history.

(56) References Cited

U.S. PATENT DOCUMENTS

| | | | |
|---|---|---|---|
| 7,043,729 B2 * | 5/2006 | Lewis | ............... G06F 9/4812 710/262 |
| 7,469,335 B2 | 12/2008 | Chu | |
| 9,323,932 B2 | 4/2016 | Kegel | |
| 9,471,785 B2 | 10/2016 | Zaidi | |
| 2003/0154392 A1 | 8/2003 | Lewis | |

FOREIGN PATENT DOCUMENTS

WO    WO-0152062 W    7/2001

\* cited by examiner

*Primary Examiner* — Tasnima Matin
(74) *Attorney, Agent, or Firm* — Knobbe, Martens, Olson & Bear, LLP

(57) ABSTRACT

An example non-transitory computer readable storage medium comprising instructions that when executed cause a processor of a computing device to: in response to a trigger of a system management mode (SMM), verify all processor threads have been pulled into the SMM; in response to a successful verification, enable write access to a non-volatile memory of the computing device via two registers, where the writing access is disabled upon booting of the computing device; and upon exiting the SMM, disable the write access via the two registers.

15 Claims, 3 Drawing Sheets

NON-VOLATILE MEMORY WRITE ACCESS CONTROL

BACKGROUND

System Management Mode (SMM) is a special operating mode for a processor, in particular for an x86 processor. A processor can enter the SMM via a system management interrupt.

BRIEF DESCRIPTION OF THE DRAWINGS

Some examples of the present application are described with respect to the following figures.

DETAILED DESCRIPTION

During the System Management Mode (SMM), access to a non-volatile memory where platform firmware is stored may be needed (e.g., to perform a firmware upgrade or configuration). However, cases have been found in computing devices where write access to the non-volatile is enabled before waiting for all processor threads to be pulled into SMM. This creates a window between the time the first thread gets into SMM and the last thread does, where untrusted code (e.g., malicious code) then is able to write to the non-volatile memory to comprise the computing device.

Examples described herein provide an approach to ensure all processor threads have been pulled into SMM before enabling write access to the non-volatile memory. Thus, the likelihood of untrusted code having write access to the non-volatile memory is reduced.

In an example, a computing device includes a non-volatile memory, a communication interface connected to the non-volatile memory to control access to the non-volatile memory, and a processor connected to the communication interface. The processor is to: upon booting of the computing device, disable write access to the non-volatile memory via the communication interface; in response to a trigger of a system management mode (SMM), verify all processor threads have been pulled into the SMM; in response to a successful verification, enable write access to the non-volatile memory via the communication interface; and upon exiting the SMM, disable write access to the non-volatile memory via the communication interface.

In another example, a non-transitory computer readable storage medium includes instructions that when executed cause a processor of a computing device to: in response to a trigger of a system management mode (SMM), verify all processor threads have been pulled into the SMM; in response to a successful verification, enable write access to a non-volatile memory of the computing device via two registers, where the writing operation is disabled upon booting of the computing device; and upon exiting the SMM, disable the write access via the two registers.

In another example, a non-transitory computer readable storage medium comprising instructions that when executed cause a processor of a computing device to: in response to a trigger of a system management mode (SMM), verify all processor threads have been pulled into the SMM; in response to a successful verification, set a pair of control bits in a Serial Peripheral Interface (SPI) ROM controller register and a control bit in a Peripheral Component Interconnect (PCI) register to enable write access to a non-volatile memory of the computing device, where the writing operation is disabled upon booting of the computing device; and upon exiting the SMM, clear the pair of control bits and the control bit to disable the write access.

Figure 1:
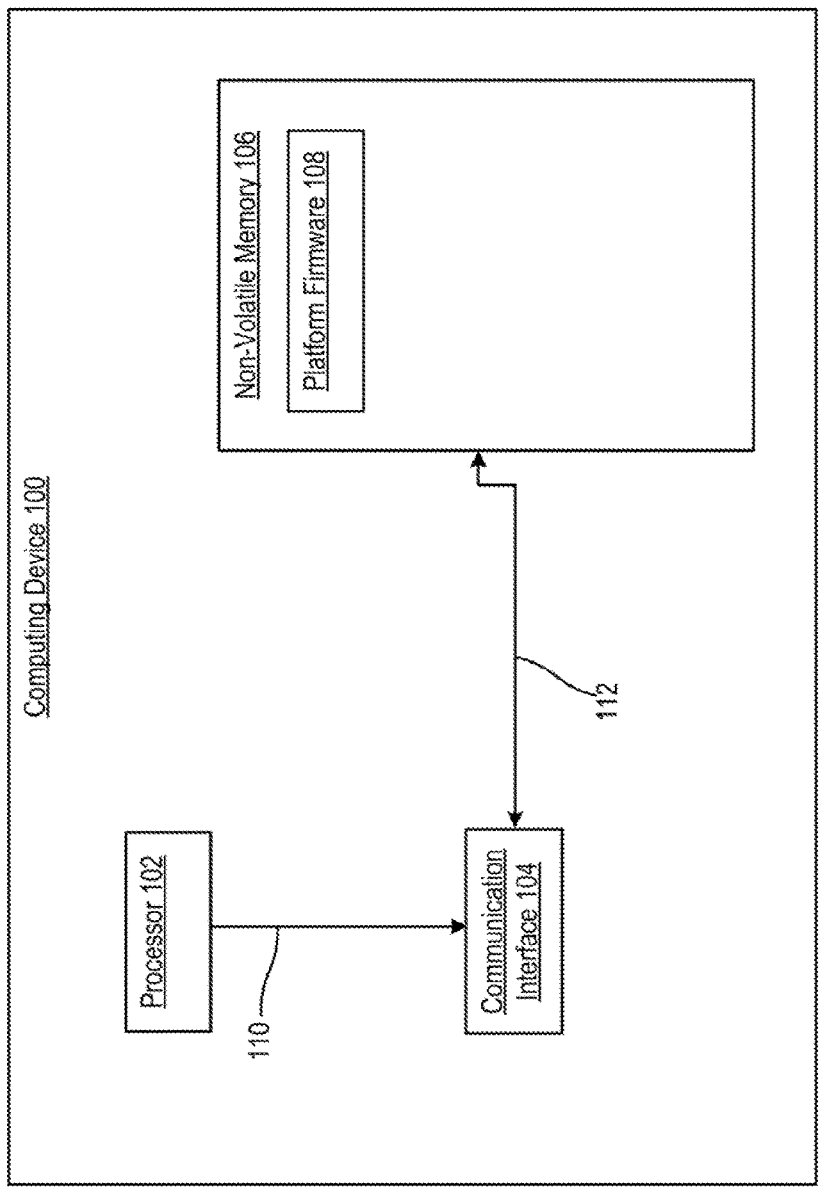
FIG. 1 illustrates a computing device that controls write access to a non-volatile memory based on a processor thread verification, according to an example.

Turning to FIG. 1A, FIG. 1 illustrates a computing device 100 that controls access to a non-volatile memory based on a processor thread verification, according to an example. Computing device 100 may be, for example, a notebook computer, a desktop computer, an all-in-one system, a tablet computing device, a mobile phone, an electronic book reader, a wearable computing device, or any electronic device that is suitable to control write access to a non-volatile memory based on processor thread verification.

Computing device 100 includes a processor 102, a communication interface 104, a non-volatile memory 106, and platform firmware 108. Processor 102 is connected to communication interface 104 via a bus 110, such as a Peripheral Component Interconnect (PCI) bus. Communication interface 104 is connected to non-volatile memory 106 via a bus 112. Platform firmware 108 is stored in non-volatile memory 106. Thus, non-volatile memory 106 is a re-writable Read Only Memory (ROM), not a main storage device for computing device 100 that stores an operating system for computing device 100. Non-volatile memory 106 may be implemented using flash memory, such as NOR flash memory, or NAND flash memory.

Communication interface 104 controls access to non-volatile memory 106. That is, a write operation to store data in non-volatile memory 106 or a read operation to read data stored in non-volatile memory 106 is to be controlled or performed by communication interface 104. As an example, write access and read access to non-volatile memory 106 are implemented using a Serial Peripheral Interface (SPI) protocol. Thus, communication interface 104 is the SPI master and non-volatile memory 106 is the SPI slave. Communication interface 104 can be implemented using circuitry, executable instructions, or a combination thereof to carry out the functionalities of a SPI master based on the SPI protocol. Similarly, non-volatile memory 106 can be implemented using circuitry, executable instructions, or a combination thereof to implement the role of a SPI slave. Bus 112 can be implemented as a SPI bus.

During operation, when computing device 100 is initially booting up, processor 102 disables write access to non-volatile memory 106 via communication interface 104. As described in more detail in FIG. 2, processor 102 configures communication interface 104 to disable write access to non-volatile memory 106. Thus, if an entity attempts to write data to non-volatile memory 106 by issuing a write command or opcode to communication interface 104. Communication interface 104 will ignore the write command. In some examples, write access also includes the ability to erase data in non-volatile memory 106.

When platform firmware 108 is to carry out an operation in non-volatile memory 106, such as an operation to store BIOS configuration data to non-volatile memory 106, platform firmware 108 sends a trigger, such as System Management Interrupt (SMI), to processor 102 to cause processor 102 to enter into SMM. In response to the trigger, processor 102 verifies all processor threads have been pulled into SMM. As used herein, a processor thread is pulled into SMM means a processor thread receives an SMI and begins executing from a fixed address in the trusted cod that has been loaded into a System Management Random-Access Memory (SMRAM) (not shown in the FIGS.). As used herein, trusted code means instructions that are verified by a device manufacturer to be non-malicious.

In some examples, processor 102 verifies that all processor threads have been pulled into SMM via a processor thread number comparison, Processor 102 determines the number of processor threads prior to entering SMM (e.g., during booting). After processor 102 has entered SMM, processor 102 determines a current number of processor threads, then processor 102 compares the current number of processor threads and the number of processor threads determined earlier. If the two numbers match, then processor 102 has successfully verified that all processor threads have been pulled into SMM.

In some examples, processor 102 verifies all processor threads have been pulled into SMM by modifying a processor thread specific flag to be set based on when each processor thread enters the SMM. Each processor thread includes a unique flag, when a particular processor thread is pulled into SMM, processor 102 sets the unique flag of the particular processor thread. When processor 102 verifies that each single processor thread has its own unique flag set, processor 102 has successfully verified all processor threads have been pulled into SMM. It should be understood that instead of setting a flag, clearing a flag (that is set prior to a corresponding processor thread is pulled into SMM) when the processor thread has been pulled into SMM can be done as a mechanism to verify if a processor thread has been pulled into SMM.

In response to the successful verification of all processor threads being pulled into SMM, processor 102 configures communication interface 104 to enable write access to non-volatile memory 106. Thus, platform firmware 108 is able to write data to non-volatile memory 106. Once platform firmware 108 has finished the operation (e.g., writing data to non-volatile memory 106), platform firmware 108 uses the SMI to cause processor 102 to exit SMM. Upon exiting SMM, processor 102 configures communication interface 104 to disable write access to non-volatile memory 106 again. Thus, by enabling write access to non-volatile memory 106 only after ensuring (via verification) all processor threads have been pulled into SMM, untrusted code is not able to use the window between the first processor thread is pulled into SMM and the last processor thread is pulled into SMM to compromise non-volatile memory 106.

Figure 2:
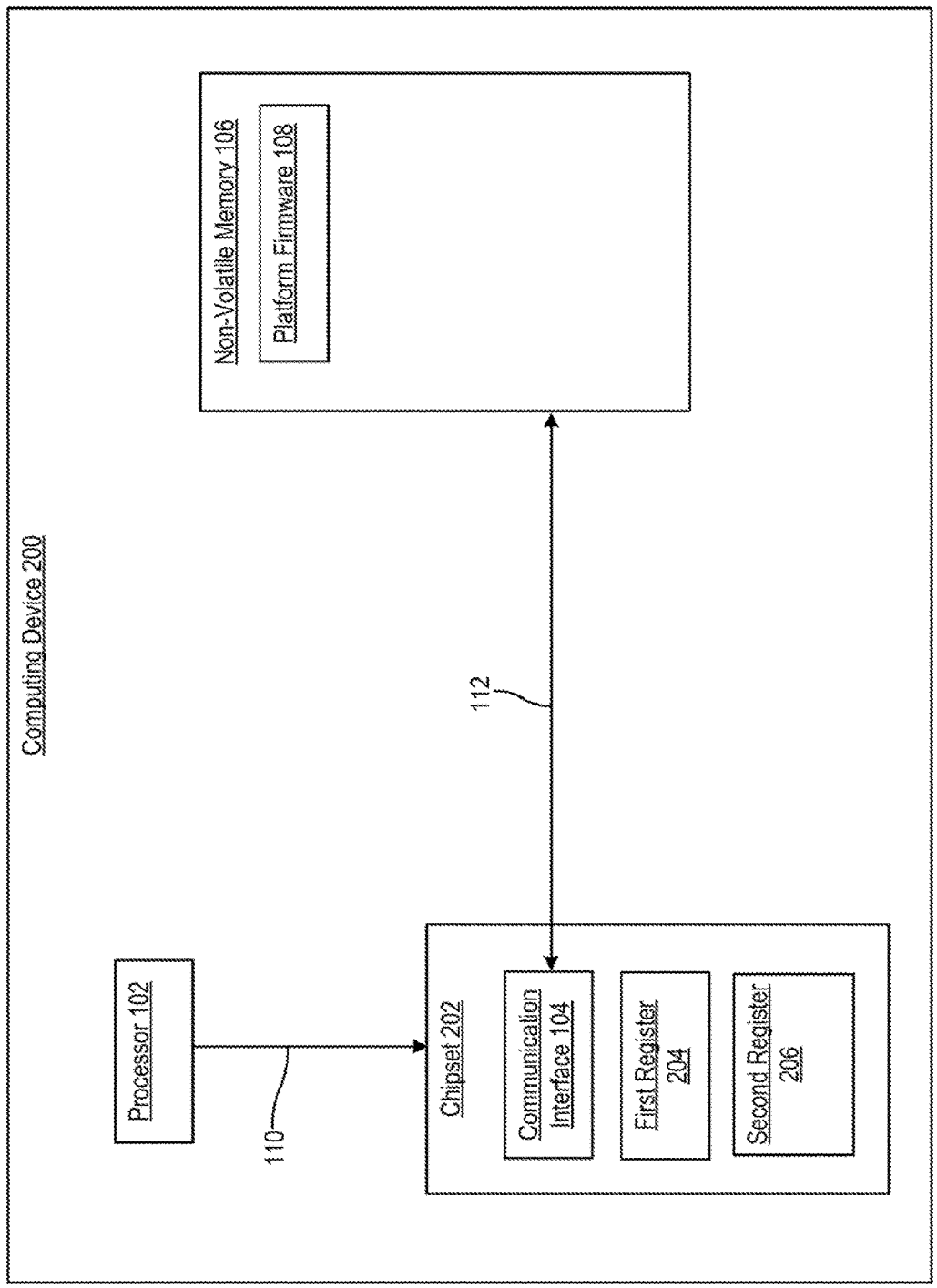
FIG. 2 illustrates a computing device that controls write access to a non-volatile memory based on a processor thread verification, according to another example.

As used herein, platform firmware 108 refers to instructions executable by processor 102 to initialize, control, or operate computing device 100 prior to execution of an operating system (OS) of computing device 100. Platform firmware 108 may initialize, control, or operate components such as hardware components of computing device 100 and may load or boot the OS of computing device 100. In some examples, platform firmware 108 implements the Unified Extensible Firmware Interface (UEFI) specification or another specification or standard for initializing, controlling, or operating a computing device, FIG. 2 illustrates a computing device 200 that controls write access to a non-volatile memory based on a processor thread verification, according to another example. Computing device 200 may implement computing device 100 of FIG. 1. Computing device 200 includes processor 102, non-volatile memory 106, platform firmware 108, and a chipset 202. Chipset 202 includes communication interface 104, a first register 204, and a second register 206.

Chipset 202 is circuitry that manages data flow between components in computing device 200, such as data flow between processor 102 and a graphics processing unit (not shown in the FIGS.), or data flow between processor 102 and an expansion bus. In some examples, chipset 202 is implemented as a platform controller hub (PCH). In some examples, chipset 202 is implemented as a fusion controller hub. In some examples, chipset 202 is implemented as a southbridge in a motherboard. In some examples, chipset 202 is integrated with processor 102. That is, chipset 202 and processor 102 are manufactured as a single integrated circuit, such as a System-on-Chip (SoC).

Registers 204 and 206 each stores configuration data associated write access to communication interface 104. As an example, first register 204 is a SPI ROM control register and second register 206 is a PCI configuration register.

First register 204 includes a set of control bits to control write access to non-volatile memory 106. Second register 206 also includes a set of control bits to control write access to non-volatile memory 106. Based on the logic values of the control bits in registers 204 and 206, write access to communication interface 104 may be disabled or enabled. The set of control bits in first register 204 includes a pair of control bits, SpiAccessMacRomEn and SpiHostAccessRomEn. The set of control bits in second register 206 includes a single control bit SMMWriteRomEn.

When computing device 200 is initially booting up, processor 102 disables write access to non-volatile memory 106 via chipset 202 by clearing the control bits SpiAccessMacRomEn and SpiHostAccessRomEn in first register 204 and the control bit SMMWriteRomEn in second register 206. For example, processor 102 clears the control bits by setting the logic values of the control bits to a logic 0. After successfully verifying all processor threads have been pulled into SMM, processor 102 sets the control bits by setting the logic values of the control bits to a logic 1 to enable write access to non-volatile memory 106. Upon exiting SMM, processor 102 clears the control bits by setting the logic values of the control bits to a logic 0 again to disable write access to non-volatile memory 106.

Although two registers are illustrated in FIG. 2, it should be understood that configuration data associated with write access to non-volatile memory may be stored in any different number of registers, such as a single register, three registers, etc. Similarly, the particular number of control bits in a register to control write access to non-volatile memory 106 may also be different.

Figure 3:
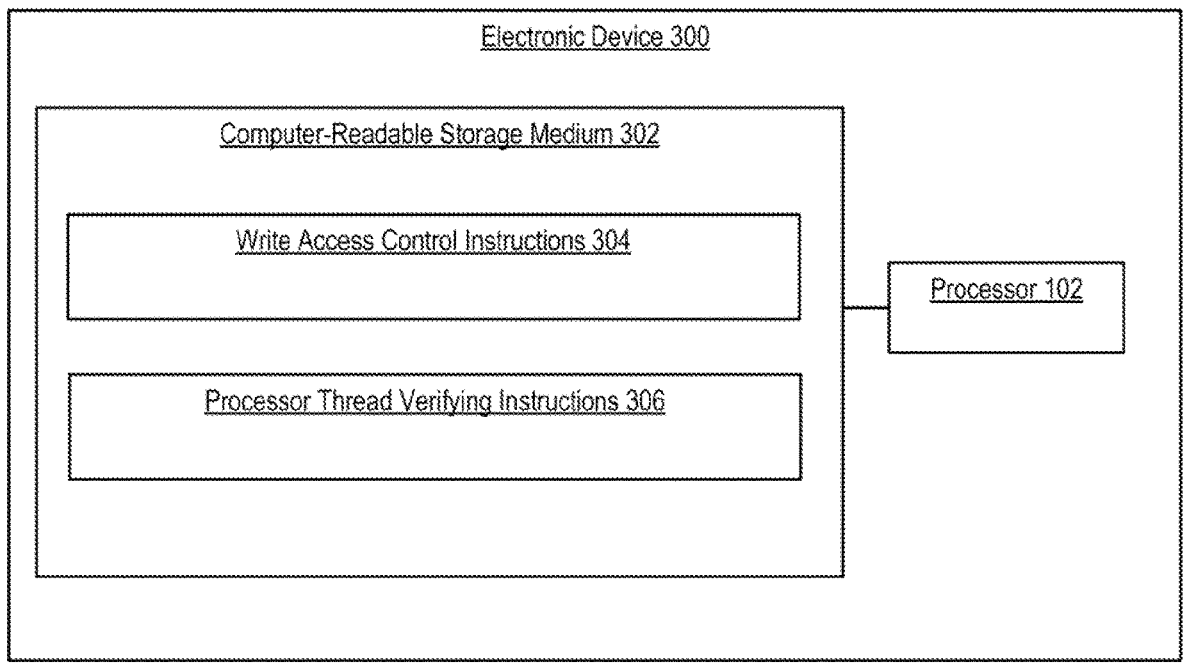
FIG. 3 illustrates a computing device that controls write access to a non-volatile memory based on a processor thread verification, according to another example.

FIG. 3 illustrates a computing device 300 that controls write access to a non-volatile memory based on a processor thread verification, according to another example. Computing device 300 may implement computing device 100 of FIG. 1 and/or computing device 200 of FIG. 2.

Computing device 300 includes processor 102 and a computer-readable storage medium 302. Processor 102 may be a central processing unit (CPU), a multi-core CPU, a processing core within a multi-core CPU, a semiconductor-based microprocessor, an integrated circuit (e.g., a field-programmable gate array, an application-specific integrated circuit), and/or other hardware devices suitable for retrieval and execution of instructions stored in a computer-readable storage medium.

Computer-readable storage medium 302 may be any electronic, magnetic, optical, or other physical storage device that contains or stores executable instructions. Thus, computer-readable storage medium 302 may be, for example, Random Access Memory (RAM), an Electrically Erasable Programmable Read-Only Memory (EEPROM), a storage device, an optical disc, etc. In some examples, computer-readable storage medium 302 may be a non-transitory storage medium, where the term "non-transitory" does not encompass transitory propagating signals, Computer-readable storage medium 302 is encoded with a series of processor executable instructions 304 and 306.

Write access control instructions 304 enable or disable write access to a non-volatile memory, such as non-volatile memory 106 of FIGS. 1 and 2. For example, referring to FIG. 1, processor 102 disables write access to non-volatile memory 106 via communication interface 104. Processor thread verifying instructions 306 verifies all processor threads have been pulled into SMM before enabling write access to the non-volatile memory. For example, referring to FIG. 1, in response to the trigger, processor 102 verifies all processor threads have been pulled into SMM.

What is claimed is:

1. A computing device comprising:
   a non-volatile memory;
   a communication interface connected to the non-volatile memory to control access to the non-volatile memory; and
   a processor connected to the communication interface, wherein the processor is to:
   upon booting of the computing device, disable write access to the non-volatile memory via the communication interface;
   in response to a trigger of a system management mode (SMM), verify all processor threads have been pulled into the SMM;
   in response to a successful verification, enable write access to the non-volatile memory via the communication interface; and
   upon exiting the SMM, disable write access to the non-volatile memory via the communication interface.

2. The computing device of claim 1, further comprising platform firmware, wherein the platform firmware is stored in the non-volatile memory.

3. The computing device of claim 1, wherein the communication interface is integrated in a chipset of the computing device.

4. The computing device of claim 3, wherein the processor is to disable or enable access to the communication interface via the chipset.

5. A non-transitory computer readable storage medium comprising instructions that when executed cause a processor of a computing device to:
   in response to a trigger of a system management mode (SMM), verify all processor threads have been pulled into the SMM;
   in response to a successful verification, enable write access to a non-volatile memory of the computing device via two registers, wherein the write access is disabled upon booting of the computing device; and
   upon exiting the SMM, disable the write access via the two registers.

6. The non-transitory computer readable storage medium of claim 5, wherein the two registers include a Peripheral: Component Interconnect (PCI) configuration register and a Serial Peripheral Interface (SPI) control register.

7. The non-transitory computer readable storage medium of claim 6, wherein the instructions when executed further cause the processor to configure a set of control bits in the PCI configuration register and a set of control bits in the SPI control register to disable or enable the write access.

8. The non-transitory computer readable storage medium of claim 5, wherein the instructions when executed further cause the processor to verify all processor threads have been pulled into the SMM by:
   determining a number of processor threads prior to the trigger of the SMM;
   comparing a number of processor threads after entering into the SMM and the number of processor threads; and
   determining that all processor threads have been pulled into the SMM in response to the number of processor threads determined prior to the trigger matching the number of processor threads.

9. The non-transitory computer readable storage medium of claim 5, wherein the instructions when executed further cause the processor to verify all processor threads have been pulled into the SMM by modifying a processor thread specific flag.

10. A non-transitory computer readable storage medium comprising instructions that when executed cause a processor of a computing device to:
    in response to a trigger of a system management mode (SMM), verify all processor threads have been pulled into the SMM;
    in response to a successful verification, set a pair of control bits in a Serial Peripheral Interface (SPI) ROM controller register and a control bit in a Peripheral Component Interconnect (PCI) configuration register to enable write access to a non-volatile memory of the computing device, wherein the writing access is disabled upon booting of the computing device; and
    upon exiting the SMM, clear the pair of control bits and the control bit to disable the write access.

11. The Non-transitory computer readable storage medium of claim 10, wherein the pair of control bits are SpiAccessMacRomEn and SpiHostAccessRomEn.

12. The Non-transitory computer readable storage medium of claim 10, wherein the control bit is SMMWriteRomEn.

13. The Non-transitory computer readable storage medium of claim 10, wherein platform firmware of the computing device is stored in the non-volatile memory.

14. The Non-transitory computer readable storage medium of claim 10, wherein the SPI ROM controller register and the PCI configuration register are located in a chipset of the computing device.

15. The Non-transitory computer readable storage medium of claim 10, wherein the instructions when executed further cause the processor to verify all processor threads have been pulled into the SMM via a processor thread number comparison.

* * * * *